United States Patent Office 3,151,972
Patented Oct. 6, 1964

3,151,972
USE OF INORGANIC FIBER AS A BINDER IN
A PELLETIZED ORE
William C. Streib, North Plainfield, N.J., assignor to
Johns-Manville Corporation, New York, N.Y., a corporation of New York
No Drawing. Filed Oct. 28, 1958, Ser. No. 830,174
5 Claims. (Cl. 75—5)

The present invention relates to a method of pelletizing ores and more particularly to an improved method of pelletizing or balling iron oxide ores such as taconite ore concentrates and the pelleted iron oxide products thereof.

Rapid depletion of high grade iron and like ore reserves in the United States and thus greater dependency upon foreign ore deposits has instigated mining and metallurgical organizations to seek new means of improving and utilizing readily available lower grades of ore. Taconite ores, for example, provide a potential and plentiful source of low grade iron ore within the continnent but typical taconite ores contain only approximately 30% iron which is too low for economical recovery under normal conditions. Moreover, such low iron content ores require substantial up-grading to about 60 to 65% iron content. Up-grading techniques for low iron content ores such as taconite ores may comprise, among other methods, grinding and chemically reducing the hematite in the taconite ore to magnetite by hot reducing gases and slurrying the magnetite whereupon magnetic separation procedures are utilized to separate or concentrate the iron fraction. Recoveries of approximately 60% concentrate are obtainable after grinding to essentially minus 325 mesh. The final magnetite or other concentrate resulting from such techniques however is too fine in form (about −325 mesh) for use in normal blast furnaces and, for the most part, would be lost in the stack gases. Moreover, such fine particles are also too fine to be sintered directly by conventional techniques.

The common practice of utilizing magnetite or the like concentrate fines has been to pelletize the same by moistening the fines, adding a binder such as bentonite clay and forming pellets or "balls" in a rotary drum. These pellets or "balls" are partially dried and then fused at about 1800° F. typically by passing them through a furnace which sinters the same to form hard, compact and dense pellets which are easily handleable and may be charged into a blast furnace for further refinement or conversion to pig iron. During sintering of pelletized or balled magnetite concentrates an exothermic conversion of the magnetite to hematite raises the temperature to approximately 2350° F. Although pelletizing or balling is simply an intermediate step in the overall production of iron from low grade ores, the requirements of the unfired pellets or balls are as severe as any of the succeeding firing operations. These "green" or uncured pellets or balls must possess structural characteristics or properties which enable them to withstand vigorous handling and loading into the pelletizing furnace and travel through the furnace without breakage and they must be of such a coherency to maintain their shape throughout the critical period during firing when moisture is driven off. Numerous binders will impart varying degrees of some of the properties desired in taconite ore or magnetite concentrate pellets or balls, i.e., "green" strength, dry strength, etc., but for one reason or another conventional binders have failed to fully satisfy a majority of requirements or to fulfill all desired properties.

It is a primary object of this invention to provide an economically feasible means of increasing "green" or unfired wet strength and handleability of particulate iron oxide ore pellets or balls and improving their dimensional stability, and coherency and thermal shock resistance upon final firing.

It is a further object of this invention to provide a means which permits and/or facilitates the use of coarse sized, flaky or lenticular shaped ores or iron oxide concentrates in a pelletizing or balling process and thereby reduce the degree of grinding normally required.

It is a further object of this invention to provide a means of materially improving the thermal shock resistance of wet pelletized or balled iron oxide ore whereby higher drying and/or sintering temperatures, and more rapid exposure or entry of wet shapes to areas of high or sintering temperatures is permitted.

It is a still further object of this invention to provide a means which permits more rapid and effective pelletizing or balling of taconite ores or magnetite concentrates, increases the size of the resulting pellets or balls, and permits greater latitude or substantially extends the heretofore restricted operable range of necessary water content for pelletizing or balling and subsequent strength, etc., by reducing slumping or flow characteristics among other undesirable properties.

This invention will be more fully understood and further objects and advantages thereof will become apparent from the hereinafter detailed description.

The foregoing as well as other objects and advantages are achieved by adding a relatively small proportion of a fibrous inorganic or mineral component such as asbestos fiber, shorts or floats, in addition to adjusting the moisture content of the resulting mass, to the particulate ore or iron oxide concentrate prior to pelletizing or balling in a rotary drum. The fibrous mineral material should be included in amounts of at least approximately 1 up to about 10% by weight of the ore concentrate and about 5% by weight of the ore concentrate is normally preferred but exact optimum quantities depend upon the fibrous nature or quality of the additament. Furthermore, the increment of benefit derived from utilizing amounts of fiber substantially greater than 10% is offset by the cost thereof and increased, or possibly deleterious adulteration of the ore. The moisture content of the ore or concentrate, or mixture of said ore or concentrate and fiber should be adjusted to approximately 5 to 20% by weight of the total, preferably about 10 to 15%. It should be noted however, that different grades of asbestos fiber include different amounts of an actual fibrous component, the balance comprising fine rock or the like, and since it is the fibrous component which is the effective ingredient, equivalent amounts of different grades of asbestos often provide results differing in degree. Typically, the properties imparted are directly proportional to the fibrous content of the asbestos added. The fiber and moisture should be substantially uniformly blended with or throughout the ore or iron oxide. Accordingly, other than a small amount of moisture, no bonding agents or components such as clay or the like are necessary or need be included to impart wet strength and coherency or facilitate pelletizing or balling. However, conventional binders such as clays may be advantageously incorporated in the mass in addition to the essential fibrous component if desired or appropriate. Bentonite clay, for example, is highly effective in imparting high dried or fired pellet strength and may be advantageously utilized with inorganic fiber, which provides high "green" or wet strength and thermal shock resistance, among other properties.

In addition to both amphibole and chrysotile asbestos fibers, shorts or floats, the essential fibrous component may consist of inorganic or mineral fibers including, for example, mineral or rock wool fibers, glass fibers, talc, wollastonite or other fibrous calcium silicates, etc. Organic fibers such as cellulose fibers or synthetic resin fibrous materials, although they substantially improve "green" or wet strength of the pellets or balls, burn out upon firing, resulting in very porous, flaky shapes. Moreover, fibrous asbestos materials are highly preferred in that they not only substantially improve "green" or wet strength and dimensional stability of the shapes but asbestos materially enhances or facilitates the pelletizing or balling process by readily dispersing with the ores and fostering formation and retention of the shapes, whereas fibrous materials comprising mineral or rock, glass, cellulose, synthetic resins or the like are difficult to disperse in and mix with ores to provide satisfactory blends.

Handleable or workable pellets or the like shapes comprising particulate ore or concentrate, asbestos fiber or the like inorganic fiber and moisture may be readily formed by consolidating a substantially uniform blend of the same in a press, casting in a mold, or, blending and shaping said components in a rotary drum, i.e., subjecting said materials to the action of a rotating drum or cylinder until they are rolled or agglomerated into a plurality of strong, handleable nodules or balls. This latter procedure, balling, is typical of taconite refining techniques of shaping the bodies. Moreover, due to the tendency of asbestos fiber or the like to nodulate or ball when rolled, asbestos substantially facilitates the formation of balls or shapes as well as imparting improved stability and coherency strength characteristics to said balls or shapes.

The following examples illustrate suitable taconite ore or magnetite concentrate pellets or balls in approximate percentages by weight and methods of preparing the same. It is to be understood that the compositions of the taconite ores or magnetite concentrates are neither a part of this invention nor are they to be construed as limiting the same. Moreover, compositions of the following pellets or balls are exemplary and not to be construed to limit the invention to the particular ores or other components specified in the examples.

The taconite concentrates utilized in the following examples and tests are identified or composed as follows:

Fine taconite sample—a fine magnetic concentrate containing approximately 75% iron as magnetic oxide with the balance being largely silica. This material is essentially all below −300 mesh.

Coarse taconite sample—mixed taconite concentrate containing approximately 70.5% iron in the form of magnetic oxide and a total silica content of 1%. This material has about 12% greater than 100 mesh granules and about 21% below 325 mesh.

Evaluation and comparison of the "green" and fired strength of coherency and thermal shock resistance of wetted taconite concentrates shaped both with and without asbestos was carried out as follows:

Standard Tinius Olsen cement molds were used to form taconite or magnetite concentrate containing dumbbell shaped samples of mixes composed of the ingredients set forth in the following tables. Molding was effected simply by completely filling each mold with the wetted mass, leveling and smoothing the upper or exposed surface of each molded shape with a spatula. The wetted materials were permitted to air dry for about 1 hour before releasing from the mold. After removing the mold, each sample was allowed to air dry an additional 3 hours before placing it in an 1800° F. muffle furnace for 1 hour. The test data are given in the following tables:

EXAMPLE I

*Table 1.—Tests on Molded Taconite Concentrate Specimens*

| Taconite Used | Asbestos Fiber Used | Mix Proportions | | | Visual Observations and Comments | | |
|---|---|---|---|---|---|---|---|
| | | Percent Taconite | Percent Asbestos Fiber | Percent Water Added | In Wetted Condition | | After Firing 1 hr. at 1800° F. |
| | | | | | In Mold | After Mold Released | |
| Fine | None | 100 | 0 | 15 | Very wet, free water on surface after molding. | Slumped, deformed, could not be handled. | Very badly crumbled, only about ⅓ original size. |
| Do | 6D20 | 95 | 5 | 15 | Relatively dry, no evidence of water on surface. | Handleable, supported its own weight, no slumping. | Cracks and flaking on surface, but no serious breakdown. Retained shape. |
| Do | None | 100 | 0 | 7½ | Drier than Test 1, no free water. | Did not slump or deform, but very weak. Broke when lifted. | Disintegrated in much the same as Test 1. |
| Do | 7RF1 | 95 | 5 | 15 | Similar to Test 2 | No slump, could be handled and supported its own weight. | Surface cracks and minor flaking, but retained full shape with no crumbling. |
| Coarse | None | 100 | 0 | 15 | Extremely wet water on surface. | Well formed, did not slump, weak, broke in handling. | Disintegrated around edges and crumbled. Not as bad as Test 1. |
| Do | 6D20 | 95 | 5 | 15 | Drier than Test 5, but molded easily. | Well formed, easily handled, and much stronger than Test 5. | Absolutely no deformation, cracking, or crumbling. |

EXAMPLE II

*Table 2.—Effect of Various Fibrous Materials on Properties of Molded Fine Taconite Concentrate Specimens Fired at 1800° F.*

| Type of Fiber | Percent Fiber in Mix | Percent Water Added | Visual Observations and Comments | | | |
|---|---|---|---|---|---|---|
| | | | During Mixing | During Molding in Wetted Condition | | After Firing 1 hr. at 1800° F. |
| | | | | In Mold | After Mold Release | |
| None | None | 15 | Mixed easily | Very wet, free water on surface. | Slumped, deformed, could not be handled. | Very badly crumbled, only about ⅓ original size. |
| Rock wool | 5 | 15 | Mixed poorly, not homogeneous. | Fairly dry, but some water visible on surface. | No slumping, but poorly formed. Bottom porous. Supported its weight. | No shape distortion. Minor surface cracking. |
| Glass wool | 5 | 15 | Extremely poor mixing, definitely not homogeneous. | Fairly dry, considerable evidence of unmixed fiber. | No slumping, handleable, supported its weight. | No shape distortion. Minor surface flaking. |
| Sulfite pulp | 5 | 30 | Fair mixing, but lumpy. | Mix very wet, abundant water on surface. | No slumping, handleable. | Caught fire, leaving very porous, flaky briquette. |
| Do | 5 | 15 | Poor mixing, lumpy. | Mix very dry, poor surface. | No slumping, slight cracking during handling. | Caught fire, leaving porous briquette which flaked on handling. |
| Asbestos (7RF1) | 5 | 15 | Mixed easily, no fiber visible. | Moist surface but no free water on surface. | No slumping, completely handleable, supported its weight. | No shape distortion, very minor surface cracks. |
| Asbestos (6D20) | 5 | 15 | Mixed easily | Relatively dry, no surface water. | No slump, supported its own weight, handleable. | No shape distortion, minor surface cracks. |

EXAMPLE III

*Table 3.—Effect of Asbestos Concentration Upon Properties of Molded Fine Taconite Concentrate Specimens Fired at 1800° F.*

[15% water added in all tests]

| Asbestos Fiber | Percent Fiber in Mix | Visual Observations and Comments | | | | | |
|---|---|---|---|---|---|---|---|
| | | During Mixing | During Molding in Wetted Condition | | Briquette Wet wt., g. | After Firing 1 hr. at 1800° F. | Briquette Weight, g. |
| | | | In Mold | After Mold Release | | | |
| None | 0 | Mixed easily | Very wet, free water on surface. | Slumped, deformed, could not be handled. | (¹) | Very badly crumbled, only about ⅓ original size. | (¹) |
| FRF1 | 1 | Mixed easily, uniform. | Moist, but not excessively wet. | Soft and plastic, but no slump, supports weight in tension but not flexure. | 193 | Flaked badly, but retained about 75% of shape. | 172 |
| 7RF1 | 3 | do | Drier than tests | Slightly soft, no slump, definitely handleable and supported weight. | 195 | Very good stability compared with Test 5. Slight surface flaking but shape retained. | 173 |
| 7RF1 | 5 | do | Surface moist but no excess water on surface. | No slump, completely handleable, supported its weight. | 189 | No shape distortion, very minor surface cracks. | 160 |
| 7RF1 | 10 | Very dry mix, balls formed. | Molded satisfactorily, surface very dry. | Very strong, no slump, very easily handleable, supported own weight with ease. | 179 | Absolutely no evidence of distortion or surface cracking or flaking. | 168 |
| 6D20 | 1 | Mixed easily, uniform. | Moist, but no free water or excessive moisture. | Soft, but did not break in handling, definitely stronger than Test 5. | 195 | Good shape stability, definitely superior to Test 5. Minor surface cracking. | 173 |
| 6D20 | 3 | do | do | No slump, supported own weight easily without cracking. | 193 | Excellent shape stability, very minor surface cracks. | 171 |
| 6D20 | 5 | do | Relatively dry no surface water. | No slump, supported its own weight, easily handleable. | (¹) | No shape distortion, minor surface cracks. | (¹) |

¹ Not taken.

In Example I the addition of asbestos fiber to taconite ore or concentrates substantially improved the wet strength of the molded pellets or balls. In all cases, the wet samples formed without fiber were so weak and soft that they could not support their own weight. Additions of 5% 7RF1 or 5% 6D20 asbestos fiber improved the wet strength of these samples to such a degree that they could be very easily handled and readily supported their own weight. The dimensional stability and thermal shock resistance of the wetted taconite or magnetite concentrate samples prior to firing was also vastly improved by the addition of asbestos fiber. This was particularly true in the case of the fine (−325 mesh) material in which case the fiberless molded piece began to "slump" and deform immediately after the restraining mold was released. This did not occur when asbestos fiber or asbestos floats were incorporated with the fine magnetic concentrate. The effect of asbestos fiber upon the dimensional stability of the molded samples when fired at 1800° F. was extremely startling. Without the inclusion of asbestos, the items molded from both the fine and coarse taconite concentrates immediately began to disintegrate when placed in the furnace. This was undoubtedly due to the rapid escape of the moisture from the samples. As the moisture was driven off, minor "explosions" occurred on the surface of the sample until it finally crumbled into a shapeless mass. However, with the inclusion of asbestos fiber in the form of 7RF1 or 6D20 at the 5% level, the molded samples showed an outstanding improvement in dimensional stability. In the case of the fine (−325 mesh) concentrate, surface cracks appeared on the top of the samples, but there was only a relatively minor flaking of the surface and no crumbling. In all cases, samples containing asbestos fiber retained their original shape and integrity in contrast with the samples prepared without asbestos fiber. This was true despite the fact that under these firing conditions (1800° F.) asbestos fiber loses almost all of its strength and becomes brittle.

Example II illustrates the effect of 5% inorganic or mineral fiber other than asbestos as well as organic fibrous materials. Other than asbestos, both inorganic and organic fibrous materials were difficult to disperse and mix with the ore concentrates. However, once mixed the inorganic fibers imparted good "green" or wet strength, shape retention and resistance to thermal shock. Organic fiber containing pellets, though exhibiting good "green" or wet strength, failed to satisfactorily endure firing.

It will be understood that the details given are for the purposes of illustration, not restriction, and that variations within the spirit of this invention are intended to be included in the scope of the appended claims.

What I claim is:

1. A method of pelletizing particulate iron oxide ore concentrates comprising binding the particulate ore with inorganic fiber, said method consisting essentially of the steps of combining with the iron oxide ore concentrates asbestos fiber in amount of approximately 1 to 10% by weight of said ore, adjusting the moisture content of the combined mass to approximately 5 to 20% by weight of the total, and pelletizing the mass.

2. A method of pelletizing particulate iron oxide ore concentrates comprising binding the particulate ore with inorganic fiber, said method consisting essentially of the steps of combining with the iron oxide ore concentrates asbestos fiber in amount of approximately 1 to 10% by weight of said ore, adjusting the moisture content of the combined mass to approximately 10 to 15% by weight of the total, and pelletizing the mass.

3. A method of pelletizing particulate iron oxide concentrates comprising binding the particulate ore with inorganic fiber, said method consisting essentially of the steps of combining with the iron oxide ore concentrates asbestos fiber in amount of approximately 1 to 10% by weight of said ore, adjusting the moisture content of the combined mass to approximately 5 to 20% by weight of the total, and balling the mixture in a rotary ball drum.

4. An ore pellet for use in a blast furnace which consists essentially of particulate iron ore concentrates bonded with approximately 1 to 10%, by weight of said iron ore concentrates, of asbestos fiber together with moisture in amount of approximately 5 to 20% by weight of the total mass.

5. A fused ore pellet comprising thermally reacted particulate iron ore concentrates bonded with approximately 1 to 10%, by weight of said iron ore concentrates, of asbestos fiber together with moisture in amount of approximately 10 to 15% by weight of the total mass.

References Cited in the file of this patent

UNITED STATES PATENTS

| | | |
|---|---|---|
| 2,411,873 | Firth | Dec. 3, 1946 |
| 2,446,990 | Schuetz | Aug. 10, 1948 |
| 2,559,572 | Stalego | July 3, 1951 |
| 2,592,521 | Thompson | Apr. 8, 1952 |
| 2,693,668 | Slayter | Nov. 9, 1954 |
| 2,865,731 | Crowe | Dec. 23, 1958 |
| 2,870,689 | Brennan | Jan. 27, 1959 |